(12) United States Patent
Chan et al.

(10) Patent No.: US 10,127,395 B2
(45) Date of Patent: Nov. 13, 2018

(54) AD HOC TARGET BASED PHOTOGRAPH SHARING

(71) Applicant: INTERNATIONAL BUSINESS MACHINES CORPORATION, Armonk, NY (US)

(72) Inventors: Yuk Lung Chan, Rochester, NY (US); Heidi Lagares-Greenblatt, Pittsburgh, PA (US); Deepti M. Naphade, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 15/197,979

(22) Filed: Jun. 30, 2016

(65) Prior Publication Data

US 2018/0004966 A1    Jan. 4, 2018

(51) Int. Cl.
*G06F 21/62* (2013.01)
*G06T 1/00* (2006.01)
*G06K 9/00* (2006.01)
*G06F 17/30* (2006.01)

(52) U.S. Cl.
CPC .......... *G06F 21/62* (2013.01); *G06F 17/3028* (2013.01); *G06F 17/30247* (2013.01); *G06K 9/00664* (2013.01); *G06T 1/0007* (2013.01)

(58) Field of Classification Search
CPC .......... G06K 9/00664; G06K 9/00684; G06K 9/00778; G06F 21/62; G06F 17/30247; G06F 17/3028; G06T 1/0007
See application file for complete search history.

(56) References Cited

U.S. PATENT DOCUMENTS

| | | | |
|---|---|---|---|
| 9,280,545 | B2 | 3/2016 | Padmanabhan et al. |
| 2007/0027591 | A1 | 2/2007 | Goldenberg et al. |
| 2014/0153837 | A1 | 6/2014 | Steiner |
| 2014/0267747 | A1 | 9/2014 | Kritt et al. |

*Primary Examiner* — Siamak Harandi
(74) *Attorney, Agent, or Firm* — Cantor Colburn LLP; William A. Kinnaman, Jr.

(57) ABSTRACT

Methods, systems and computer program products for sharing of photographs based on targets depicted in the photographs are provided. Aspects include receiving photographs of an event from one or more users, wherein each of the photographs include metadata related to the photograph and a usage policy for the photograph, identifying one or more targets depicted in the photographs based at least in part on the metadata and storing the photographs in a database. Aspects also include receiving an access request for photographs that include a first target from a requestor, wherein the access request includes an indication of the desired use, identifying one or more photographs in the database that depict the first target and which permit the desired use and providing the one or more photographs to the requester.

18 Claims, 5 Drawing Sheets

AD HOC TARGET BASED PHOTOGRAPH SHARING

BACKGROUND

The present invention generally relates to sharing photographs, and more particularly to ad hoc sharing of photographs based on targets depicted in the photographs.

The increasing popularity of smartphones that include high-resolution cameras has led to people taking and sharing photographs. When traveling, attending an event, or watching a sporting event (e.g. football game, horse race or automobile race), there are many users taking photo/video at the same time.

However, when a user at an event wants to take a picture or video of a particular target (e.g. a football player, particular horse or car), the quality of the photo depends on the current location of the user (e.g. the seat) and the location of the target. In many cases, the user may not have a clear line of sight of the target or may be too far away from the target to capture the desired photograph.

Therefore, heretofore unaddressed needs still exist in the art to address the aforementioned deficiencies and inadequacies.

SUMMARY

In accordance with an embodiment, a method for sharing of photographs based on targets depicted in the photographs is provided. The method includes receiving photographs of an event from one or more users, wherein each of the photographs include metadata related to the photograph and a usage policy for the photograph, identifying one or more targets depicted in the photographs based at least in part on the metadata and storing the photographs in a database. The method also includes receiving an access request for photographs that include a first target from a requestor, wherein the access request includes an indication of the desired use, identifying one or more photographs in the database that depict the first target and which permit the desired use and providing the one or more photographs to the requester.

In another embodiment of the invention, a processing system for sharing of photographs based on targets depicted in the photographs includes a processor configured to receive photographs of an event from one or more users, wherein each of the photographs include metadata related to the photograph and a usage policy for the photograph, identify one or more targets depicted in the photographs based at least in part on the metadata and store the photographs in a database. The processor is also configured to receive an access request for photographs that include the first target from a requestor, wherein the access request includes an indication of the desired use, identify one or more photographs in the database that depict the first target and which permit the desired use and provide the one or more photographs to the requester.

In accordance with a further embodiment, a computer program product for sharing of photographs based on targets depicted in the photographs includes a non-transitory storage medium readable by a processing circuit and storing instructions for execution by the processing circuit for performing a method. The method includes receiving photographs of an event from one or more users, wherein each of the photographs include metadata related to the photograph and a usage policy for the photograph, identifying one or more targets depicted in the photographs based at least in part on the metadata and storing the photographs in a database. The method also includes receiving an access request for photographs that include a first target from a requestor, wherein the access request includes an indication of the desired use, identifying one or more photographs in the database that depict the first target and which permit the desired use and providing the one or more photographs to the requester.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
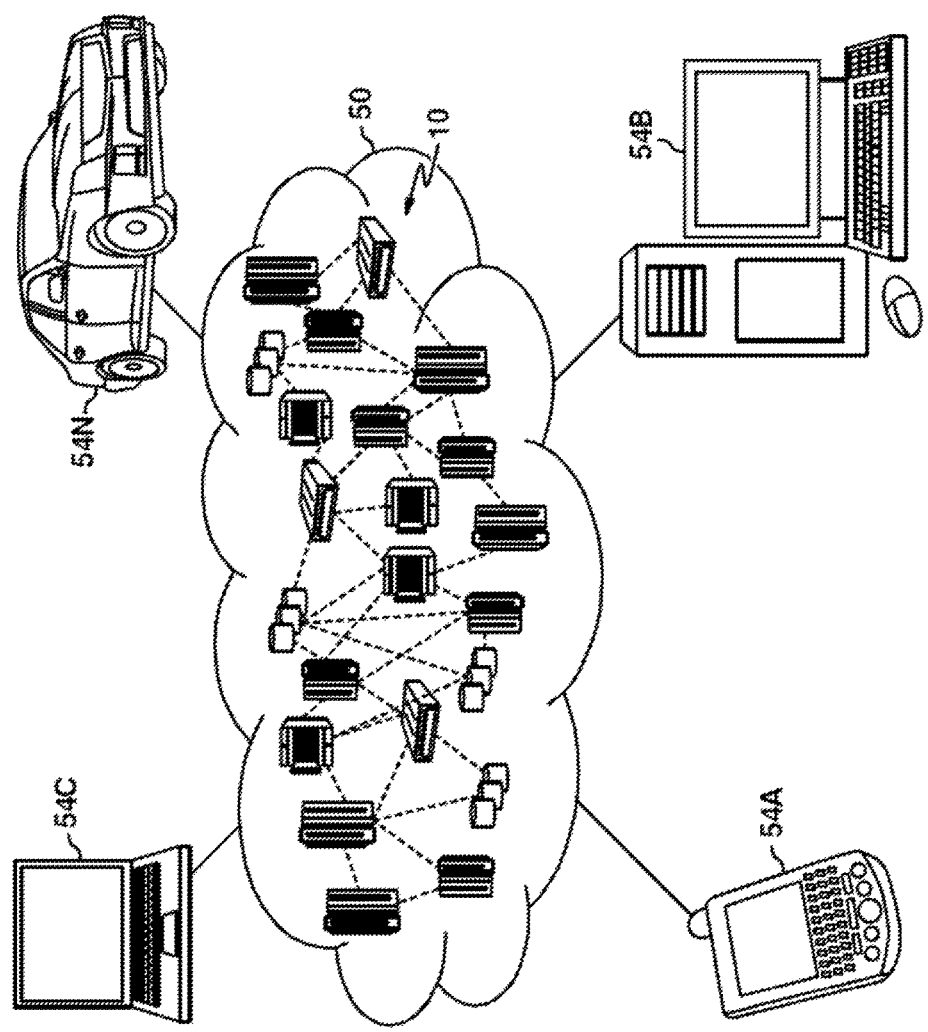
FIG. 1 depicts a cloud computing environment according to an embodiment of the present invention.

Embodiments include methods, systems, and computer program products for sharing of photographs based on targets depicted in the photographs. In exemplary embodiments, a photograph sharing system is configured to receive photographs from individuals at an event that depict one or more targets. The photograph sharing system stores the photographs along with metadata that indicates the depicted targets and other relevant information. Other users of the photograph sharing system can search for photographs of a desired target at the event. In exemplary embodiments, the photographs may be stored with a usage policy determined by the individual that captured the photograph. In exemplary embodiments, the metadata may include geographic information, such as the user's GPS location, user's devices orientation/direction.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
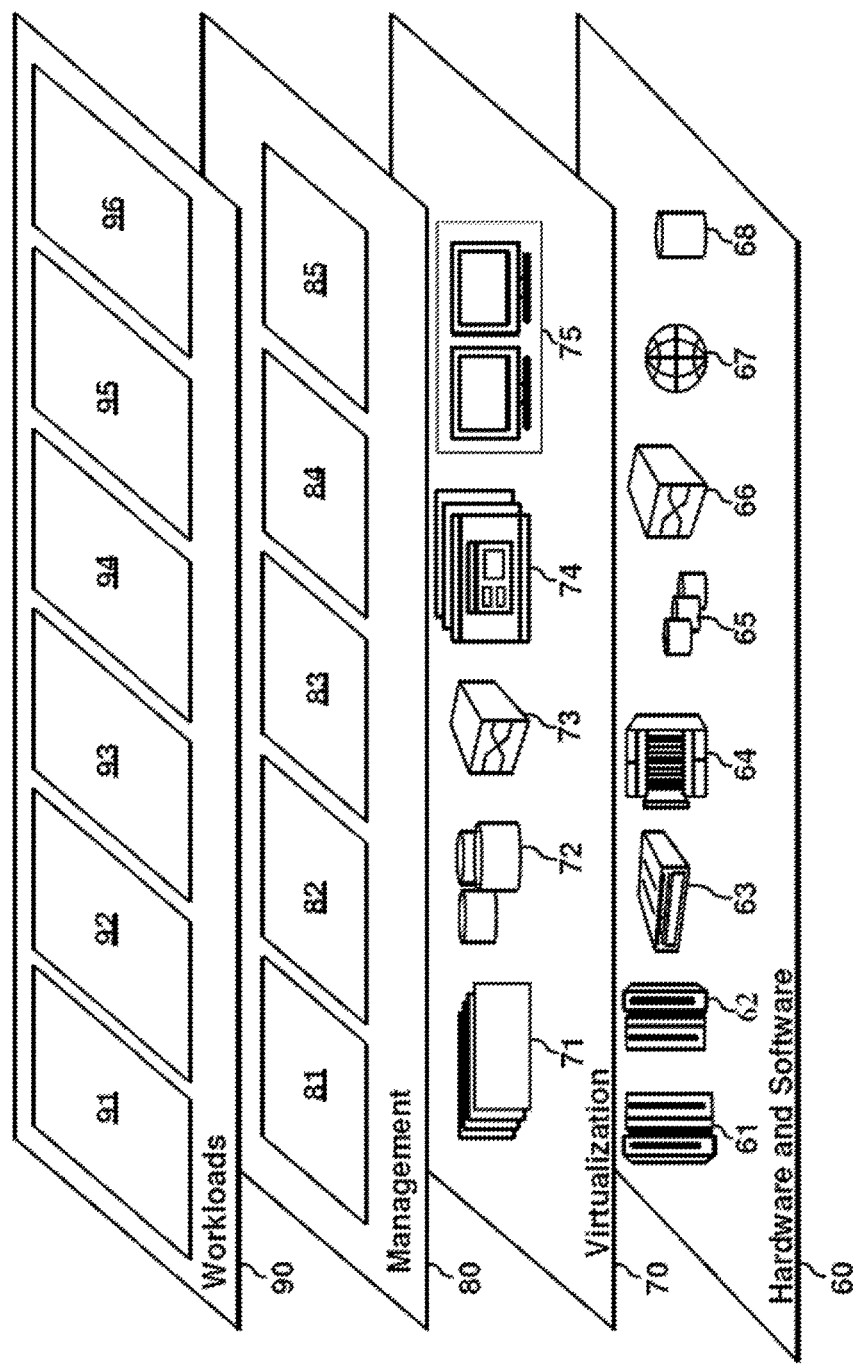
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and photograph sharing 96.

Figure 3:
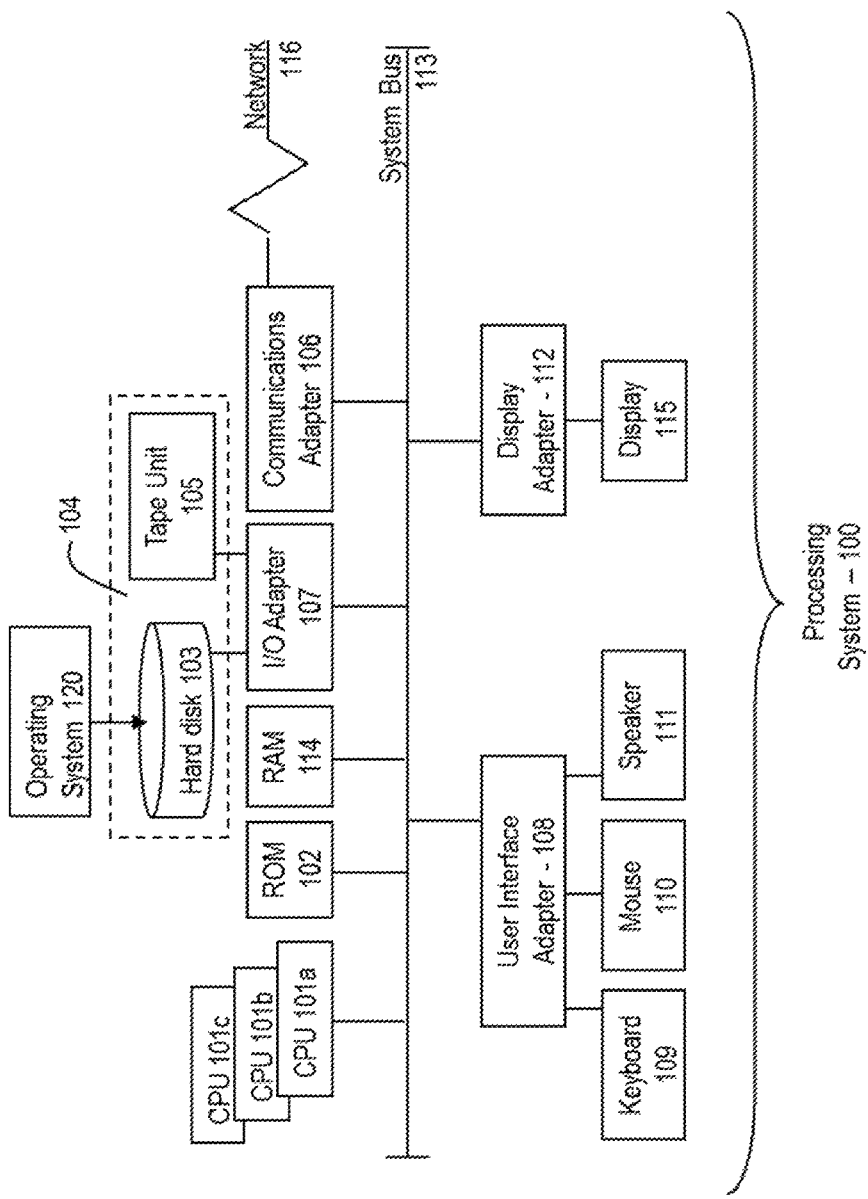
FIG. 3 is a block diagram illustrating one example of a processing system for practice of the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 3, the processing system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 4:
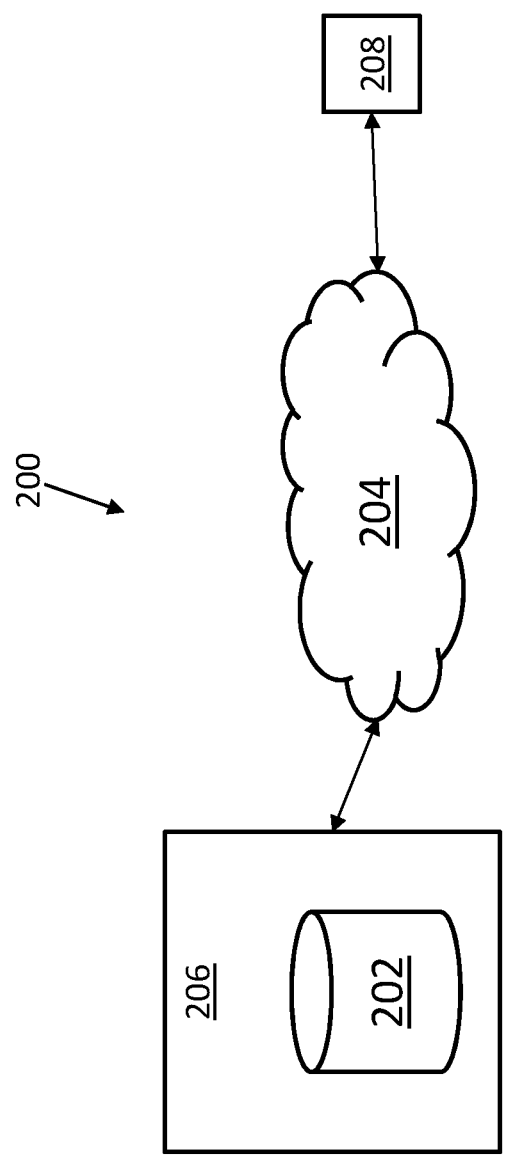
FIG. 4 is a block diagram illustrating a system for sharing of photographs based on targets depicted in the photographs in accordance with exemplary embodiments.

Referring now to FIG. 4, a system 200 for sharing of photographs based on targets depicted in the photographs in accordance with an embodiment is shown. As illustrated, the system 200 includes a camera 208 that is used to capture a photograph and a processing system 206 that is configured to store the photograph in a database 202. In one embodiment, the processing system 206 can be a processing system such as the one shown in FIG. 3 above. In exemplary embodiments, the camera 208 can be embodied in a smartphone, tablet or the like which is configured to transmit the photograph to the processing system via a communications network 204.

In exemplary embodiments, the database 202 is configured to store photographs, metadata and usage policies associated with the photographs. The database 202 may be a public, private, or semi-private image database that is accessible by the communications network 204. The communications network 204 may include, but is not limited to, a cellular communications network, the Internet, a private network, and the like. In exemplary embodiments, the camera 208 includes a GPS sensor and is configured to attach metadata, such as a geotag and timestamp, to photographs as they are captured and saved.

In exemplary embodiments, the processing system 206 is configured to search the image database 202 based on receiving a request, which includes one or more of a requested target and the desired use. In one embodiment, the processing system 206 uses the metadata to identify photographs that depict the requested target and then performs a comparison between the desired use and the usage policy of the identified photographs. Once photographs that depict the requested target and which permit the desired use are selected, the processing system 206 responds to the query by providing the selected photographs.

Figure 5:
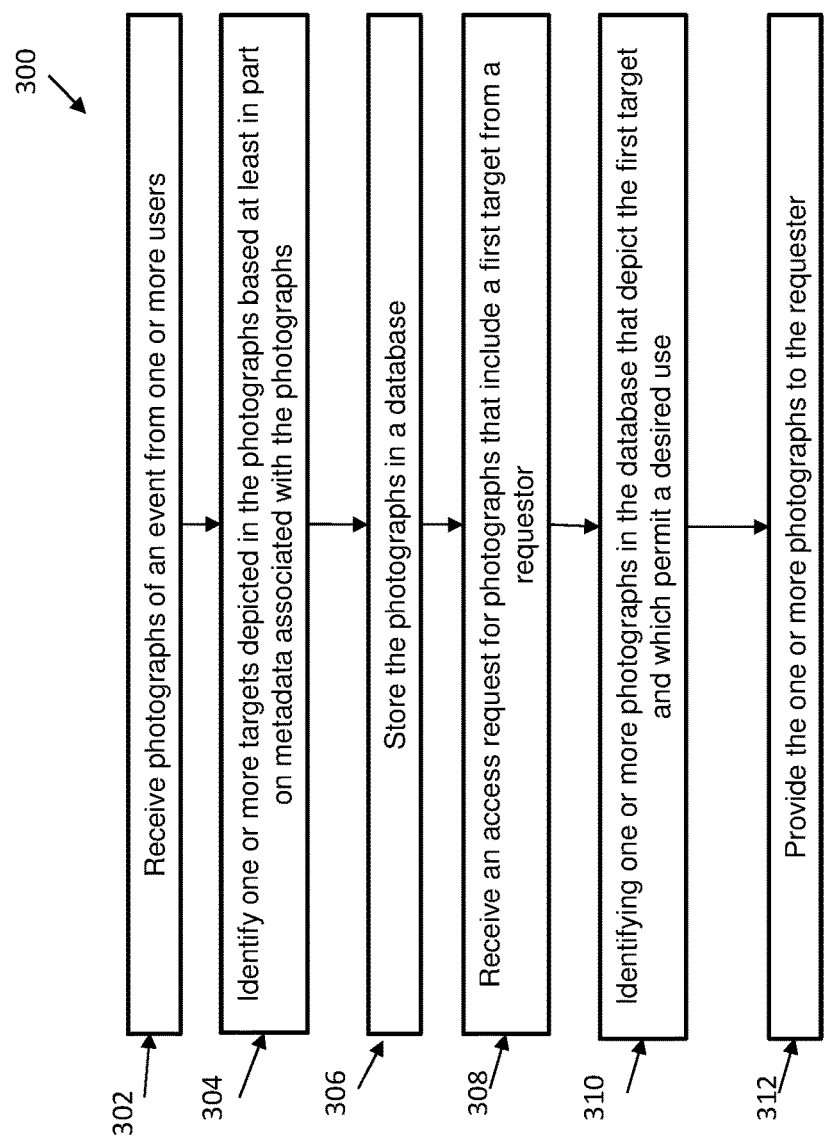
FIG. 5 shows a flow chart illustrating a method for sharing of photographs based on targets depicted in the photographs in accordance with an embodiment.

Referring now to FIG. 5, a method 300 for sharing photographs based on targets depicted in the photographs is shown. As shown at block 502, the method 500 includes receiving photographs of an event from one or more users. In exemplary embodiments, each of the photographs includes metadata related to the photograph and a usage policy for the photograph. In exemplary embodiments, the metadata includes at least one of a GPS location of a camera that captured the photograph at a time the photograph was captured, an orientation of the camera at the time the photograph was captured, a timestamp of the time the photograph was captured.

Next, as shown at block 304, the method 300 includes identifying one or more targets depicted in the photographs based at least in part on the metadata. In exemplary embodiments, identifying one or more targets depicted in each of the photographs can be further based on a query of a public database for the metadata. In one example, the public database can include a map of the event depicted in one of the photographs and information regarding targets participating in the event. The public database may include data, including photographs and video, from sources such as television cameras at the event and the public database can include a processing system that is configured to track a movement of a target during the event. For example, the public database may keep track of the participants, or targets, at an event and may track the movement of the targets on the playing field or stage. Accordingly, when a photograph is uploaded that has a geotag and timestamp that corresponds to the event, the processing system can tag the likely targets shown in the photograph based on the tracking of the targets and the known location and orientation of the camera that captured the image. The method 300 also includes storing the photographs in a database, as shown at block 306.

Next, as shown at block 308, the method 300 receiving an access request for photographs that include the first target from a requestor, wherein the access request includes an indication of the desired use. In one embodiment, the photograph sharing system can be on open system in which anyone can access. In another embodiment, the photograph sharing system can be a semi-public system which requires users to post and share photographs before being able to request photographs. In yet another embodiment, the photograph sharing system can be a semi-public system which requires users to post and share photographs of a particular event and/or target before being able to request photographs of that event and/or target.

The method 300 also includes identifying one or more photographs in the database that depict the first target and which permit the desired use, as shown at block 310. In exemplary embodiments, the identification is a two-step process that first identifies candidate photographs that depict the first target and compares the desired use with the usage policy of the candidate photographs. Next, as shown at block 312, the method 300 providing the one or more identified photographs to the requester.

In exemplary embodiments, the usage policy can be based on one or more of a type of event depicted in the photograph and the one or more targets depicted in the metadata. In one embodiment, a user of the photograph sharing system may set up multiple usage policies for photographs that they share and the user can select with usage policy to apply to a photograph based on the targets in the photograph or a type of event depicted in the event. For example, a user may set up a different usage policy for photographs of targets that are public individuals, such as participants in a sporting event or concert, and for private individuals such as family members. In addition, the user may set usage policies based on the event type to allow different access and user for public events, such as sporting events or concerts, or private events such as birthday parties or company events.

For example, a user may set a usage policy that provides that for a baseball game event type they share all of their photographs without restriction. However, for a plano recital event type, they only share photos with a usage policy that provides that the photos cannot be used for commercial purposes, magazines or new paper. The usages policy can be configured in any user desire and can include default and sample policies available for a user. The filter of what usage policy to apply to what photographs can be done using GPS, image processing and/or event information gathered from social networks such as event entries on social networks, tweets about an event happening now etc.

In exemplary embodiments, identifying the one or more targets depicted in each of the photographs is further based on an identification provided by the one or more users. In exemplary embodiments, the user is presented with an option to identify, or tag, a target in a photograph that they have captured. In one embodiment, the user may be presented with a list of potential targets based on the location of the camera at the time the photograph was taken. For example, if the camera captures a picture at a basketball game, the user may be presented with a list of popular players on the teams playing in the game that day. The user provided identification information can be saved as metadata and can be used by the photograph sharing system. In exemplary embodiments, the photograph sharing system may be configured to verify the accuracy of the identification provided by the user.

In exemplary embodiments, the processing system 206 is configured to search the image database 202 based on receiving a request, which includes one or more of a requested target and the desired use. The search can be supplemented with a set of parameters based on the target. For example, the parameter can look for photos based on the position of the viewer at the event. In another example, the parameter can look for photographs based on distance from the identified target. In another example, the parameter can look for photos that include a specific set of targets. In another example, the parameter can look for photos containing a view of the target from the right side, perhaps, this is because the target is a soccer player that kicks the soccer ball using his right foot. Depending on where the soccer player is facing, a photo from the south soccer field might satisfy the request, and at a different time, a photo from the north soccer field might satisfy the same request.

In another exemplary embodiment, the photo of the soccer player can be organized based on the path that the soccer play went through. This path can be displayed to the user graphically for navigation. The user can select search parameter that is a specified a point on the path of the play. In other embodiments, the user can navigate through a segment of the path with step size defined by physical distance or time. While the user navigates through the path, selected sample photos can be displayed to the user. These selected sample photos can be chosen using the parameters described earlier.

These search parameters can be specified using many mechanisms. For example, a soccer field can be displayed to the user, and the user can select the viewer location by pointing at the specific location in the soccer field on a touch screen computing device. In another example, a target can be displayed, the user can rotate the target and select the desirable view using an input device such as a mouse. In another example, the search parameters can be generated based on another input photo. Multiple search attributes from one or more input photos can be extracted. These attributes include the targets, the locations of the target, or the locations of the camera when the photos are captured. One or more attributes can be selected and modified, and use as parameters to search for other photos. These modifications can include adding or subtracting a specific time, adding or subtracting a specific distance along a path for a target, choosing a specific direction of view for a target, choosing a specific camera or viewer location, or retrieving the path of a target surrounding the position of the target for further navigation. In one example, the user can capture a photo during an event and use it as a "bookmark" or reminder and, at a different time or after the event, the user can look for other photos based on the bookmark photo.

Although discussed above primarily with respect to photographs, it will be apparent to those of ordinary skill in the art that the methods and systems taught herein could be used in the sharing of video clips. For example, each frame, or a selected subset of frames, of the video can be treated as a separate photograph has a specific timestamp. Based on this timestamp, multiple targets in the video frame can be identified. The frame in the video can be extracted based on the target(s), and can be combined or viewed with other media (including other video, photo).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for target based photograph sharing, the method comprising:
   receiving photographs of an event from one or more users, wherein each of the photographs includes metadata related to the photograph and a usage policy for the photograph;
   identifying one or more targets depicted in the photographs based at least in part on the metadata;
   storing the photographs in a database;
   receiving an access request for photographs that include a first target from a requestor, wherein the access request includes an indication of a desired use;
   identifying one or more photographs in the database that depict the first target and which permit the desired use; and
   providing the one or more photographs to the requestor, wherein the usage policy for each of the photographs is based on one or more of a type of event depicted in the photograph and the one or more targets depicted in the photograph.

2. The computer-implemented method of claim 1, wherein the metadata includes at least one of a GPS location of a camera that captured the photograph at a time the photograph was captured, an orientation of the camera at the time the photograph was captured, and a timestamp of the time the photograph was captured.

3. The computer-implemented method of claim 1, wherein identifying one or more targets depicted in each of the photographs is further based on a query of a public database for the metadata.

4. The computer-implemented method of claim 3, wherein the public database includes a map of the event depicted in one of the photographs and information regarding targets participating in the event.

5. The computer-implemented method of claim 4, wherein the public database is configured to track a movement of a target during the event.

6. The computer-implemented method of claim 1, wherein identifying the one or more targets depicted in each of the photographs is further based on an identification provided by the one or more users.

7. The computer-implemented method of claim 1, wherein the requestor is required to upload a photograph of the event before being provided the one or more photographs.

8. The computer-implemented method of claim 1, wherein identifying the one or more photographs that include the first target and which permit the desired use includes:
   selecting each photograph that includes the first target; and
   comparing the desired use to the usage policy of the selected photographs.

9. The computer-implemented method of claim 1, wherein identifying the one or more photographs that include the first target includes receiving one or more parameters for the first target that includes one or more of:
   a position of requestor relative to the first target;
   a distance between the first target and the requestor, and
   a path of the first target during the event.

10. A computer program product for target based photograph sharing, the computer program product comprising:
   a non-transitory storage medium readable by a processing circuit and storing instructions for execution by the processing circuit for performing a method comprising:
   receiving photographs of an event from one or more users, wherein each of the photographs includes metadata related to the photograph and a usage policy for the photograph;
   identifying one or more targets depicted in the photographs based at least in part on the metadata;
   storing the photographs in a database;
   receiving an access request for photographs that include a first target from a requestor, wherein the access request includes an indication of a desired use;
   identifying one or more photographs in the database that depict the first target and which permit the desired use; and
   providing the one or more photographs to the requestor, wherein the usage policy for each of the photographs is based on one or more of a type of event depicted in the photograph and the one or more targets depicted in the photograph.

11. The computer program product of claim 10, wherein the metadata includes at least one of a GPS location of a camera that captured the photograph at a time the photograph was captured, an orientation of the camera at the time the photograph was captured, and a timestamp of the time the photograph was captured.

12. The computer program product of claim 10, wherein identifying one or more targets depicted in each of the photographs is further based on a query of a public database for the metadata.

13. The computer program product of claim 12, wherein the public database includes a map of the event depicted in one of the photographs and information regarding targets participating in the event.

14. The computer program product of claim 13, wherein the public database is configured to track a movement of a target during the event.

15. The computer program product of claim 10, wherein identifying the one or more targets depicted in each of the photographs is further based on an identification provided by the one or more users.

16. The computer program product of claim 10, wherein the requestor is required to upload a photograph of the event before being provided the one or more photographs.

17. The computer program product of claim 10, wherein identifying the one or more photographs that include the first target and which permit the desired use includes:
   selecting each photograph that includes the first target; and
   comparing the desired use to the usage policy of the selected photographs.

18. A processing system for target based photograph sharing includes a processor, the processor configured to:
   receive photographs of an event from one or more users, wherein each of the photographs includes metadata related to the photograph and a usage policy for the photograph;
   identify one or more targets depicted in the photographs based at least in part on the metadata;
   store the photographs in a database;
   receive an access request for photographs that include a first target from a requestor, wherein the access request includes an indication of a desired use;
   identify one or more photographs in the database that depict the first target and which permit the desired use; and
   provide the one or more photographs to the requestor, wherein the usage policy for each of the photographs is based on one or more of a type of event depicted in the photograph and the one or more targets depicted in the photograph.

* * * * *